(12) United States Patent
Nakamura

(10) Patent No.: US 10,693,156 B2
(45) Date of Patent: Jun. 23, 2020

(54) POWER SOURCE DEVICE

(71) Applicant: TOYOTA JIDOSHA KABUSHIKI KAISHA, Toyota-shi, Aichi-ken (JP)

(72) Inventor: Ikuhiro Nakamura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/164,246

(22) Filed: Oct. 18, 2018

(65) Prior Publication Data

US 2019/0157691 A1     May 23, 2019

(30) Foreign Application Priority Data

Nov. 22, 2017   (JP) ................................. 2017-225085

(51) Int. Cl.
| | | |
|---|---|---|
| *H01M 8/04007* | (2016.01) | |
| *H01M 8/04701* | (2016.01) | |
| *B60L 58/26* | (2019.01) | |
| *B60L 58/33* | (2019.01) | |
| *H01M 10/625* | (2014.01) | |
| *H01M 10/613* | (2014.01) | |
| *H01M 2/02* | (2006.01) | |

(52) U.S. Cl.
CPC ......... *H01M 8/04067* (2013.01); *B60L 58/26* (2019.02); *B60L 58/33* (2019.02); *H01M 2/0237* (2013.01); *H01M 8/04738* (2013.01); *H01M 10/613* (2015.04); *H01M 10/625* (2015.04)

(58) Field of Classification Search
None
See application file for complete search history.

(56) References Cited

U.S. PATENT DOCUMENTS

2017/0250435 A1     8/2017   Katano et al.

FOREIGN PATENT DOCUMENTS

| | | |
|---|---|---|
| JP | 2017-152286 A | 8/2017 |
| JP | 2019-096538 A | 6/2019 |

*Primary Examiner* — Carmen V Lyles-Irving
(74) *Attorney, Agent, or Firm* — Oliff PLC

(57) ABSTRACT

A power source device may include a casing housing a fuel cell or a battery; a small room provided in the casing, the small room partitioned from a main space in which the fuel cell or the battery is housed; a cooler arranged at a floor of the small room; a first electric component being in contact with a lower surface of the floor so as to be opposed to the cooler; and a second electric component being in contact with an upper surface of the floor so as to be opposed to the cooler, an amount of heat generated by the second electric component being smaller than an amount of heat generated by the first electric component, wherein the casing may include a through hole communicating the small room with the main space.

4 Claims, 3 Drawing Sheets

POWER SOURCE DEVICE

CROSS-REFERENCE TO RELATED APPLICATION

This application claims priority to Japanese Patent Application No. 2017-225085 filed on Nov. 22, 2017, the contents of which are hereby incorporated by reference into the present application.

TECHNICAL FIELD

The technique disclosed herein relates to a power source device that includes a fuel cell or a battery, and an electric component

BACKGROUND

A power source unit is known in which a fuel cell or a battery and an electric component are housed in one casing or a plurality of casings coupled to each other. Japanese Patent Application Publication No. 2017-152286 describes an example of a power source device including a fuel cell as a power source. This document describes a fuel cell device that includes a lower casing housing the fuel cell, and an upper casing coupled onto the lower casing and housing electric components. Some of the electric components are attached to a back of a top plate of the upper casing.

SUMMARY

A fuel cell and a battery are heavy, and thus they are often arranged in a lower part of a casing. Meanwhile, electric components are arranged above the fuel cell or the battery. Among the electric components housed in the casing, there is an electric component that generates a large amount of heat. In some cases, a cooler for cooling such an electric component may also be housed in the casing. Since the fuel cell or the battery is arranged in the lower part of the casing, the cooler for cooling the electric component is located above the fuel cell or the battery in some cases. During operation of the cooler, dew condensation may sometimes occur at a location far from the electric component that generates a large amount of heat. The disclosure herein relates to a power source device in which a cooler is housed in a casing together with a fuel cell or a battery, and provides a technique of devising an internal structure of the casing such that water droplets of dew condensation do not fall onto the fuel cell or the battery.

A power source device disclosed herein may comprise a casing housing a fuel cell or a battery; a small room provided in the casing, the small room partitioned from a main space in which the fuel cell or the battery is housed; a cooler arranged at a floor of the small room; a first electric component being in contact with a lower surface of the floor so as to be opposed to the cooler; and a second electric component being in contact with an upper surface of the floor so as to be opposed to the cooler, an amount of heat generated by the second electric component being smaller than an amount of heat generated by the first electric component, wherein the casing may comprise a through hole communicating the small room with the main space.

In the above-mentioned power source device, the main space and the small room communicate with each other. In the small room, the second electric component that generates a smaller amount of heat than the first electric component is arranged. The cooler has a sufficient cooling capacity to cool the first electric component that generates a large amount of heat. Inside of the small room in which the second electric component that generates a small amount of heat is arranged becomes cooler than the main space in which the first electric component is arranged. Therefore, dew condensation occurs inside the small room. By causing dew condensation to occur in the small room, dew condensation is less likely to occur in the main space. Consequently, water droplets of the dew condensation can be prevented from falling onto the fuel cell or the battery.

The dew condensation may occur on the floor of the small room. Due to this, in a case where the through hole is provided in the floor of the small room, a rib which has a tubular shape, surrounds the through hole, and extends upward may be desirably provided on the floor of the small room. Water droplets of the dew condensation occurring on the floor of the small room can be prevented from falling into the through hole. Further, a no-heat-generating component may be arranged on the floor of the small room. By preventing a temperature of the floor from rising, dew condensation is more likely to occur on the floor. In particular, the no-heat-generating component may be desirably arranged next to the tubular rib.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved a power source device.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

A power source device of an embodiment will be described below with reference to the accompanying drawings. The power source device of the embodiment is a fuel cell unit 2 that includes a fuel cell as a power source. The fuel cell unit 2 is used as a power source of an electric traction motor for vehicle and mounted on a vehicle.

Figure 1:
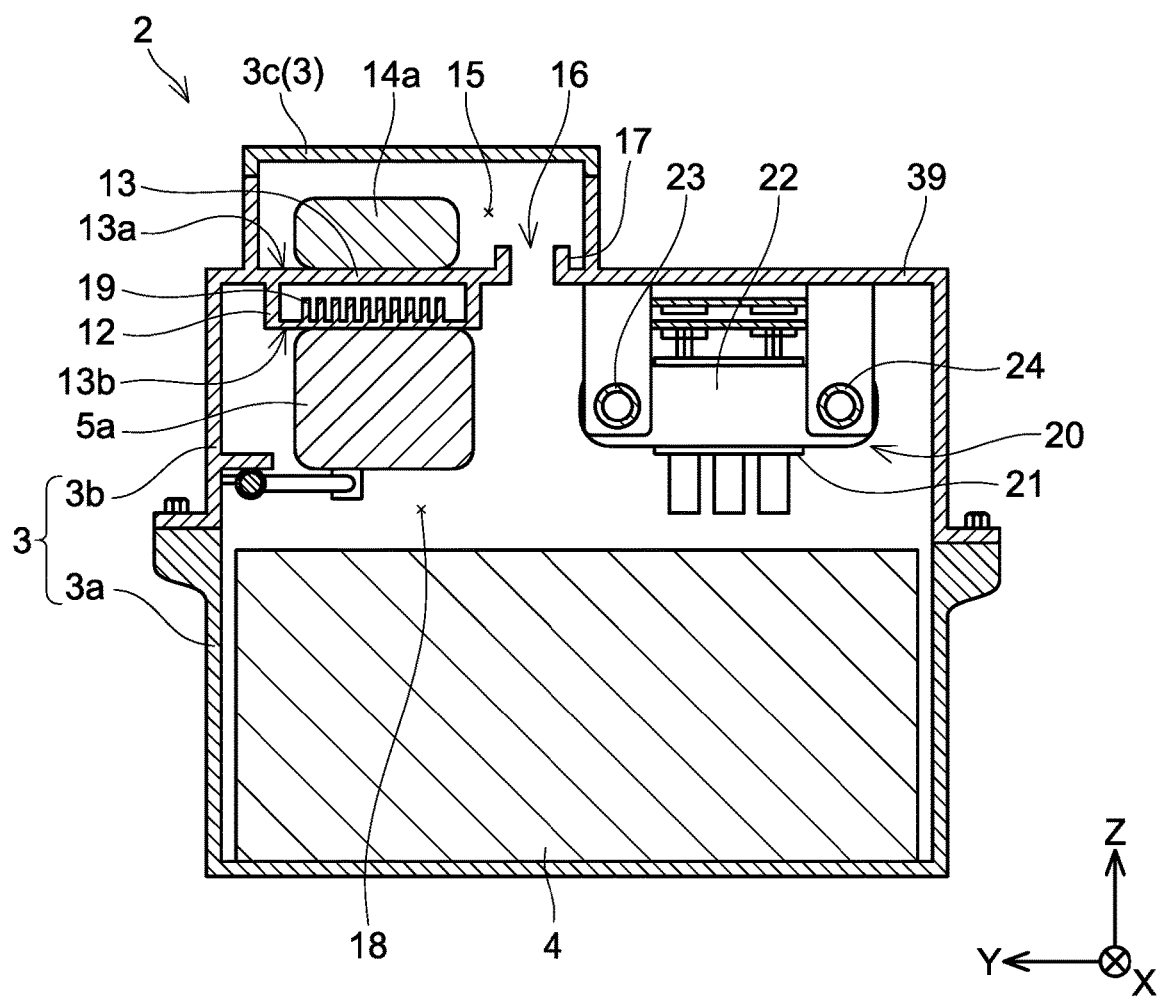
FIG. 1 is a cross-sectional view of a fuel cell unit (power source device)

FIG. 1 shows a cross-sectional view of the fuel cell unit 2. A +Z direction of a coordinate system in each of the drawings corresponds to "upper". A casing 3 of the fuel cell unit 2 is divided into a lower casing 3a, an upper casing 3b, and a cover 3c. The upper casing 3b is coupled to the lower casing 3a on an upper side. A stack (a fuel cell 4) of a plurality of fuel cells is heavy, and thus it is housed in the lower casing 3a. Various electric components are housed in the upper casing 3b. The various electric components are inevitably arranged above the fuel cell 4. Some of electric components are housed in the upper casing 3b. Although the remaining electric components are housed in the lower casing 3a, the illustration thereof is omitted in the drawings. Since the plurality of electric components is distributed to be arranged in the lower casing 3a and the upper casing 3b, an internal space of the casing 3 can be used efficiently.

Figure 2:
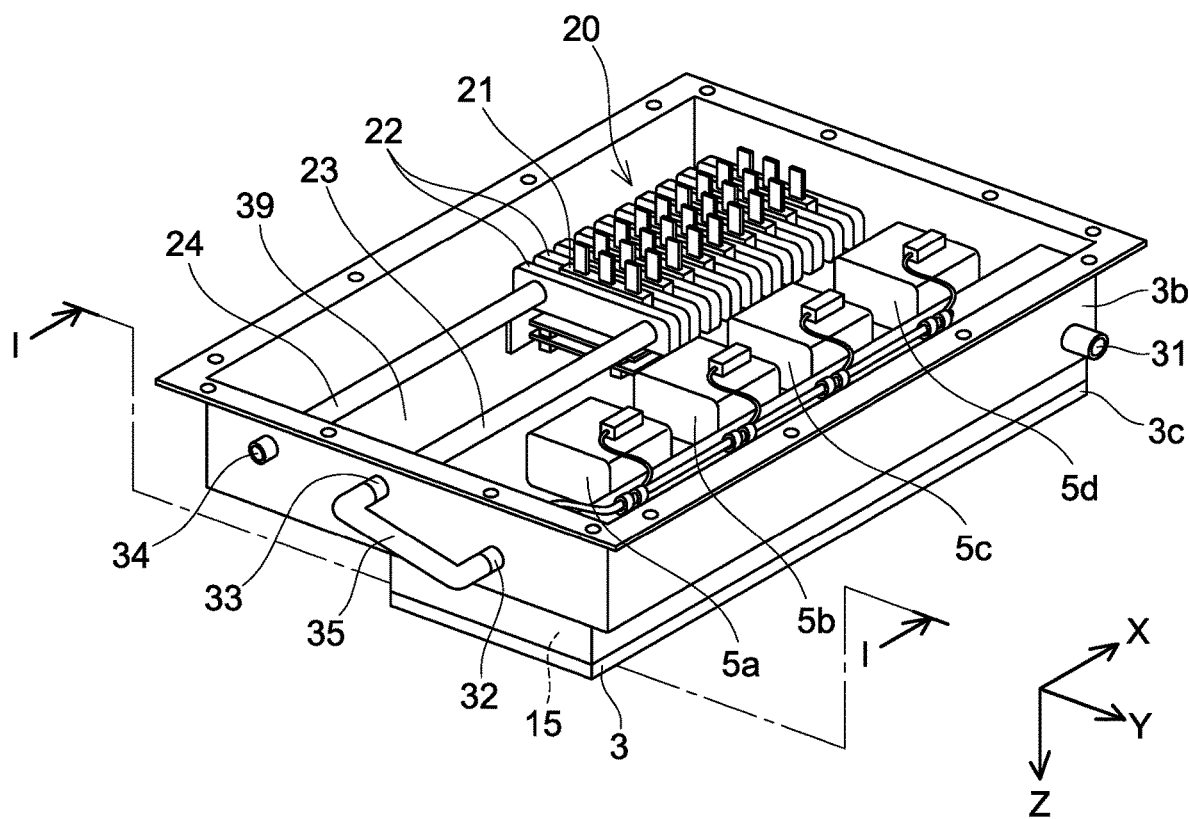
FIG. 2 is a perspective view of an upper casing of the fuel cell unit viewed obliquely from below.
Figure 3:
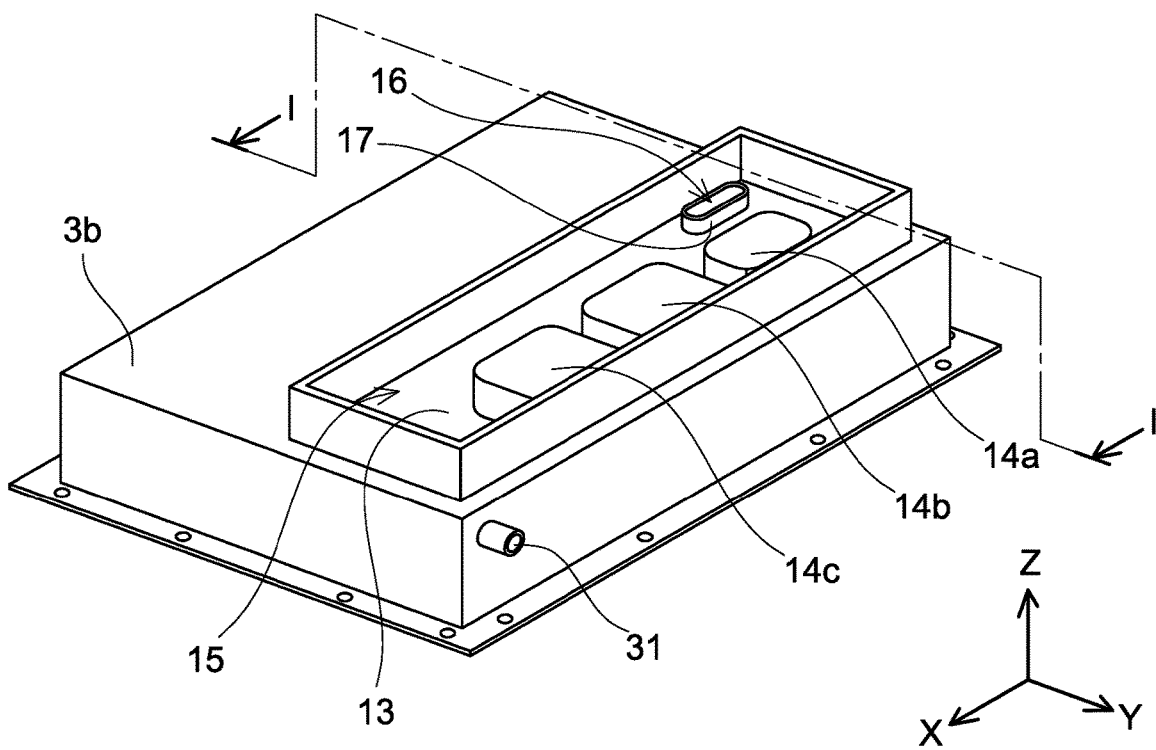
FIG. 3 is a perspective view of the upper casing viewed obliquely from above.
Figure 4:
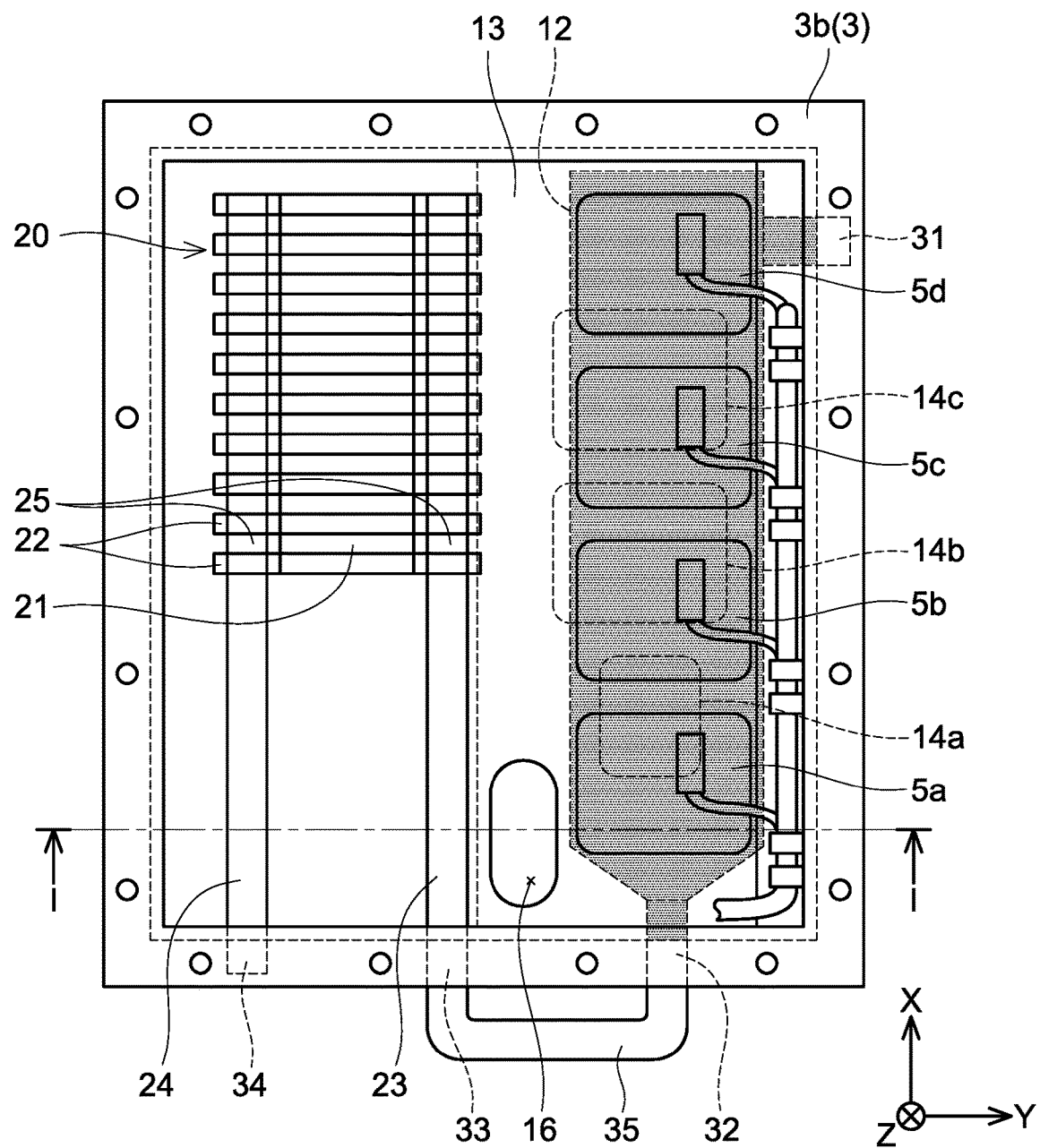
FIG. 4 is a bottom view of the upper casing.

FIG. 2 shows a perspective view of the upper casing 3b viewed obliquely from below, and FIG. 3 shows a perspective view of the upper casing 3b viewed obliquely from above. The cross section of the upper casing 35 shown in FIG. 1 is a cross section taken along a line I-I shown in FIGS. 2 and 3. It should be noted that FIG. 2 is the perspective view with the upper casing 3b inverted. That is, a plate that appears to be a bottom plate in FIG. 2 is a top plate 39 located uppermost in the fuel cell unit 2. FIG. 4 shows a bottom view of the upper casing 3b. Electric component(s) is also housed on a −X direction side relative to a stacked unit 20 (to be described later) in FIG. 2 and in FIG. 4. However, in the present embodiment, the illustration of this electric component (these electric components) is omitted in the drawings.

A layout of components in the upper casing 3b will be described. The electric components housed in the upper casing 3b constitute a boost converter circuit that boosts an output voltage of the fuel cell. The boost converter circuit is of a chopper type, and main components thereof include some switching elements and reactors 5a to 5d. Since the output of the fuel cell 4 largely fluctuates, the fuel cell unit 2 includes a multiphase converter. Thus, the fuel cell unit 2 includes the plurality of reactors 5a to 5d corresponding to respective phases of the multiphase converter.

The switching element, which is a main component of the multiphase converter, is housed in each of a plurality of card-type power modules 21. The plurality of power modules 21 and a plurality of card-type coolers 22 are alternately stacked one upon the other to constitute the stacked unit 20. Each pair of coolers 22 which are adjacent to each other is coupled by two coupling pipes 25. Each of the coolers 22 is a cooling medium flow passage through which cooling medium passes. The cooling medium flow passages of two coolers 22 communicate with each other by the coupling pipes 25. The cooling medium flow passages of all of the coolers 22 communicate with each other by the coupling pipes 25. In the perspective view of FIG. 2, reference signs are given only to the power module 21 and two coolers 22 located closest to an end of the stacked unit 20 in a −X direction, and reference signs are omitted for the remaining power modules and coolers. In the bottom view of FIG. 4 as well, reference signs are given only to the power module 21 and the two coolers 22 located closest to the end of the stacked unit 20 in the −X direction and the two coupling pipes 25, and reference signs are omitted for the remaining power modules and coolers, and coupling pipes are not denoted by reference characters.

The stacked unit 20 is also housed in the upper casing 3b. The stacked unit 20 is fixed to a back side of the top plate 39 of the upper casing 3b. A supply pipe 23 and a discharge pipe 24 are connected to the cooler 22 located at one end of the stacked unit 20. The supply pipe 23 is arranged so as to be aligned with the coupling pipes 25 arranged on one side in a stacking direction of the plurality of coolers 22. The discharge pipe 24 is arranged so as to be aligned with the coupling pipes 25 arranged on the other side in the stacking direction of the plurality of coolers 22. The supply pipe 23 connects to a flow passage port 33 provided in a side surface of the upper casing 3b, and the discharge pipe 24 connects to a flow passage port 34 provided in the side surface of the upper casing 3b.

The upper casing 3b includes another cooler 12 to be described later. The cooler 12 connects to a flow passage port 32 provided in the side surface of the upper casing 3b and to a flow passage port 31 provided in another side surface of the upper casing 3b. The flow passage port 32 and the flow passage port 33 are connected by a U-shaped pipe 35.

The flow passage port 31 and the flow passage port 34 are connected to a cooling medium circulation device (not shown). The cooling medium is supplied from the flow passage port 31 to the cooler 12. While passing through the cooler 12, the cooling medium absorbs heat from the reactors 5a to 5d and electric components 14a to 14c to be described later. The cooling medium that has passed through the cooler 12 is distributed to the plurality of coolers 22 through the flow passage port 32, the U-shaped pipe 35, the flow passage port 33, the supply pipe 23, and the coupling pipes 25 arranged on the one side. While passing through each of the coolers 22, the cooling medium absorbs heat from its adjacent power modules 21. The cooling medium that has absorbed heat from the reactors 5a to 5d and the power modules 21 is discharged from the flow passage port 34 through the coupling pipes 25 arranged on the other side and the discharge pipe 24, and is then returned to the cooling medium circulation device (not shown). The cooling medium is liquid, such as water or a Long Life Coolant (LLC).

The casing 3 includes a small room 15 partitioned from a main space 18 in which the fuel cell 4, the reactors 5a to 5d, and the stacked unit 20 are housed. The small room 15 is provided on the top plate 39 of the upper casing 3b. The small room 15 is provided above the fuel cell 4. The small room 15 has its upper side closed by the cover 3c. Although the small room 15 is partitioned from the main space 18, it communicates with the main space 18 via a through hole 16 to be described later. The electric components 14a to 14c are housed in the small room 15. The electric components 14a and 14b are, for example, connectors. The electric component 14c is, for example, an inverter, or the like.

The cooler 12 described above is arranged at a floor 13 of the small room 15. Specifically, the cooler 12 is built in the floor 13 of the small room 15. An upper surface 13a of the floor 13 also corresponds to an upper surface of the cooler 12, and a lower surface 13b of the floor 13 also corresponds to a lower surface of the cooler 12. The cooler 12 can cool components that are in contact with either the upper surface 13a or the lower surface 13b of the floor 13. The cooler 12 is a flow passage through which the cooling medium passes, and a plurality of fins 19 is provided on a lower surface of the flow passage. The reactors 5a to 5d are in contact with the lower surface of the cooler 12, in other words, the lower surface 13b of the floor 13 of the small room 15. The electric components 14a to 14c are in contact with the upper surface of the cooler 12, in other words, the upper surface 13a of the floor 13 of the small room 15.

Although at least one of the electric components 14a to 14c generate heat when energized, an amount of heat generated by the reactors 5a to 5d is much larger than an amount of heat generated by the electric components 14a to 14c. Both the reactors 5a to 5d and the electric components 14a to 14c are cooled by the cooler 12. The fins 19 are provided on the lower surface of the cooler 12, and thus the lower surface of the cooler 12 has higher cooling efficiency than the upper surface of the cooler 12 which is not provided with a fin. The reactors 5a to 5d that generate a large amount of heat are in contact with this lower surface of the cooler 12.

As mentioned above, the reactors 5a to 5d generate a large amount of heat, and hence the cooler 12 is required to have a high cooling capacity. However, when the cooler 12 exhibits a high cooling capacity, a temperature in the main space 18 decreases at a location far from the reactors 5a to 5d and dew condensation tends to occur. If the dew condensation occurs above the fuel cell 4 in the main space 18, moisture contained in the dew condensation may fall on the fuel cell 4. Adhesion of water droplets onto the fuel cell 4 should be avoided. In the fuel cell unit 2, in order to prevent water droplets from falling onto the fuel cell 4, the through hole 16 which leads to the main space 18 is provided in the floor 13 of the small room 15. An internal space of the small room 15 and the main space 18 communicate with each other via the through hole 16. A humidity in the main space 18 becomes the same as a humidity in the small room 15. The cooler 12 having the high cooling capacity is built in the floor 13 of the small room 15, and the electric components 14a to 14c, at least one of which does not generate heat and the remaining of which generates a smaller amount of heat than the reactors 5a to 5d housed in the main space 18, are provided on the upper surface of the cooler 12 (the upper surface 13a of the floor 13 of the small room 15). Due to this, under a humidity and temperature sufficient to cause dew condensation, there is a high possibility that dew condensation occurs first inside the small room 15. If the dew condensation occurs in the small room 15, a possibility that dew condensation occurs in the main space 18 becomes relatively low. The fuel cell unit 2 prevents dew condensation from occurring in the main space 18 by providing the through hole 16 that communicates the main space 18 in which the fuel cell 4 is housed with the small room 15 partitioned from the main space 18.

The floor 13 of the small room 15 is provided with a rib 17 which has a tubular shape, surrounds the through hole 16, and extends upward. The rib 17 prevents water droplets of the dew condensation on the floor 13 from falling through the through hole 16.

The electric components 14a and 14b, which are arranged on the floor 13 of the small room 15 so as to be located next to the tubular rib 17, are connectors and do not generate heat. By arranging the no-heat-generating components (the electric components 14a and 14b) on the floor 13 of the small room 15 such that they are located next to the tubular rib 17, dew condensation is more likely to occur on the floor 13 around the tubular rib 17. The possibility of dew condensation occurring in the main space 18 can be further lowered by positively causing dew condensation on the floor 13. The electric component 14c (inverter), which generates a smaller amount of heat than the reactors 5a to 5d, is also arranged on the floor 13. The electric component 14c which generates a small amount of heat is arranged at a location farther from the rib 17 than the electric components 14a and 14b, which are the no-heat-generating components. This configuration also contributes to positively causing dew condensation on the floor 13 around the rib 17.

Some of the features of the fuel cell unit 2 described in the above embodiment will be summarized as follows. The casing 3 of the fuel cell unit 2 is divided into three parts, namely, the lower casing 3a, the upper casing 3b, and the cover 3c. The fuel cell 4, which is heavy and large in size, is housed in the lower part of the lower casing 3a. The plurality of electric components accompanied by the fuel cell 4 is distributed to be arranged in the lower casing 3a and the upper casing 3b. The small room 15 located above the fuel cell 4 is provided in the upper casing 3b. The small room 15 is partitioned from the main space 18 in which the fuel cell 4 is housed (the main space 18 inside the casing 3). Although the small room 15 is partitioned from the main space 18, the through hole 16 is provided in the floor 13 of the small room 15 so as to communicate the small room 15 with the main space 18. Further, the cooler 12 through which the liquid cooling medium passes is integrally built in the floor 13 of the small room 15. The electric components 14a to 14c are in contact with the upper surface of the cooler 12, that is, the upper surface 13a of the floor 13. The other electric components (the reactors 5a to 5d) are in contact with the lower surface of the cooler 12, that is, the lower surface 13b of the floor 13 (a surface of the floor 13 exposed to the main space 18). The amount of heat generated by at least one of the electric components 14a to 14c which are in contact with the upper surface 13a is smaller than the amount of heat generated by the electric components (the reactors 5a to 5d) which are in contact with the lower surface 13b. That is, only the electric components that do not generate heat and generate a relatively smaller amount of heat than the reactors 5a to 5d are housed in the small room 15.

As mentioned above, the through hole 16 that communicates with the main space 18 is provided in the floor 13 of the small room 15, and thus the humidity of the main space 18 is substantially equal to the humidity of the small room 15. Since only the components that generate a relatively small amount of heat are housed in the small room 15, dew condensation first occurs in the small room 15. Dew condensation is relatively unlikely to occur in the main space 18 because the dew condensation first occurs in the small room 15. Consequently, water droplets of the dew condensation are prevented from falling onto the fuel cell 4.

The floor 13 of the small room 15 is provided with the rib 17 that has a tubular shape and surrounds the through hole 16. Thus, water droplets of the dew condensation occurring on the floor 13 do not fall into the main space 18 through the through hole 16. A through hole communicating the small room 15 with the main space 18 may be provided in another location other than in the floor 13 of the small room 15. The small room 15 and the main space 18 may communicate with each other in another way other than via the through hole.

The no-heat-generating components (the electric components 14a and 14b) are arranged on the floor 13 of the small room 15 so as to be located next to the rib 17. By suppressing the temperature of the floor 13 from rising around the rib 17, dew condensation is likely to occur on the floor 13.

Points to be noted regarding the technique described in the embodiment will be listed. The reactors 5a to 5d of the embodiment correspond to an example of "first electric component". The electric components 14a to 14c correspond to an example of "second electric component". An amount of heat generated by the first electric component only needs to be larger than an amount of heat generated by the second electric component. In other words, the amount of heat generated by the second electric component only needs to be smaller than the amount of heat generated by the first electric component. In a case where a plurality of the first electric components is in contact with the cooler 12 and a plurality of the second electric components is in contact with the cooler 12, a total amount of heat generated by the plurality of first electric components only needs to be smaller than a total amount of heat generated by the plurality of second electric components.

The power source device of the embodiment is the fuel cell unit 2 that includes the fuel cell 4. The technique disclosed herein may be applied to a power source device that houses a battery instead of the fuel cell 4.

Specific examples of the present invention have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A power source device comprising:
a casing housing a fuel cell or a battery;
a room provided in the casing, the room partitioned from a main space by a partition, the fuel cell or the battery being housed in the main space, the room being smaller than the main space, an upper surface of the partition corresponding to a floor of the room, a lower surface of the partition corresponding to a ceiling of the main space;
a cooler built in the partition;
a first electric component being in contact with the ceiling so as to be opposed to the cooler; and
a second electric component being in contact with the floor so as to be opposed to the cooler, an amount of heat generated by the second electric component being smaller than an amount of heat generated by the first electric component;
wherein the casing comprises a through hole communicating the room with the main space.

2. The power source device as in claim 1, wherein
the through hole is provided in the floor, and
the floor is provided with a rib, the rib having a tubular shape, surrounding the through hole, and extending upward.

3. The power source device as in claim 2, wherein
the second electric component is a no-heat-generating component.

4. The power source device as in claim 3, wherein
the no-heat-generating component is arranged next to the rib.

* * * * *